(12) United States Patent
Hara et al.

(10) Patent No.: US 8,164,324 B2
(45) Date of Patent: Apr. 24, 2012

(54) ROTATION SENSOR

(75) Inventors: Takashi Hara, Ichinomiya (JP);
Hidenobu Muramatsu, Kariya (JP);
Glenn A. Forrest, Bow, NH (US);
Hitoshi Yabusaki, Londonderry, NH (US); Naota Nakayama, Derry, NH (US)

(73) Assignees: Aisin Seiki Kabushiki Kaisha, Aichi-ken (JP); Allegro Microsystems, Inc., Worcester, MA (US)

( * ) Notice: Subject to any disclaimer, the term of this patent is extended or adjusted under 35 U.S.C. 154(b) by 356 days.

(21) Appl. No.: 12/505,057

(22) Filed: Jul. 17, 2009

(65) Prior Publication Data
US 2010/0013467 A1    Jan. 21, 2010

(30) Foreign Application Priority Data
Jul. 18, 2008 (JP) ................. 2008-187341

(51) Int. Cl.
*G01P 3/48* (2006.01)
(52) U.S. Cl. .................. 324/166; 324/160; 324/167
(58) Field of Classification Search ............ None
See application file for complete search history.

(56) References Cited

U.S. PATENT DOCUMENTS

| | | | |
|---|---|---|---|
| 6,242,904 B1 | 6/2001 | Shirai et al. | |
| 6,339,322 B1 | 1/2002 | Loreck et al. | |
| 6,490,807 B1 | 12/2002 | Tanaka et al. | |
| 6,492,804 B2 | 12/2002 | Tsuge et al. | |
| 6,653,968 B1 | 11/2003 | Schneider | |
| 6,772,101 B1 | 8/2004 | Tanaka et al. | |
| 6,815,944 B2 | 11/2004 | Vig et al. | |
| 7,026,808 B2 | 4/2006 | Vig et al. | |
| 7,046,000 B1 * | 5/2006 | Hara et al. | 324/207.25 |
| 7,365,530 B2 * | 4/2008 | Bailey et al. | 324/207.25 |
| 7,872,435 B2 * | 1/2011 | Imai et al. | 318/599 |
| 2001/0009367 A1 | 7/2001 | Seitzer et al. | |
| 2008/0164871 A1 | 7/2008 | Bailey et al. | |
| 2009/0102469 A1 | 4/2009 | Bailey et al. | |

FOREIGN PATENT DOCUMENTS

| | | |
|---|---|---|
| DE | 25 18 054 C2 | 8/1984 |
| JP | 2-116753 A | 5/1990 |
| JP | 3-29817 A | 2/1991 |
| JP | 6-273437 A | 9/1994 |
| JP | 10-332725 A | 12/1998 |
| JP | 11-341854 A | 12/1999 |
| JP | 2001-165951 A | 6/2001 |
| JP | 2002-340613 A | 11/2002 |
| JP | 2006-145528 A | 6/2006 |
| WO | 88/09026 A1 | 11/1988 |

OTHER PUBLICATIONS

Lequesne, Bruno, et al., "High Accuracy Magnetic Position Encoder Concept," IEEE Transactions on Industry Applications; vol. 35, No. 3; May/Jun. 1999; pp. 568-576.

* cited by examiner

*Primary Examiner* — Melissa Koval
*Assistant Examiner* — Trung Nguyen
(74) *Attorney, Agent, or Firm* — Sughrue Mion, PLLC

(57) ABSTRACT

A rotation sensor includes a detecting portion, a rotational state determining portion and a pulse generating portion. The detecting portion detects a rotation of a rotational member and outputs a detection signal. The rotational state determining portion determines a rotational state of the rotational member on the basis of the detection signal in a predetermined period. The pulse generating portion generates and outputs a first pulse and a second pulse, of which waveforms differ from each other, in response to a rotational direction of the rotational member after the predetermined period. The pulse generating portion further generates and outputs a third pulse regardless of the rotational state of the rotational member in the predetermined period.

10 Claims, 11 Drawing Sheets

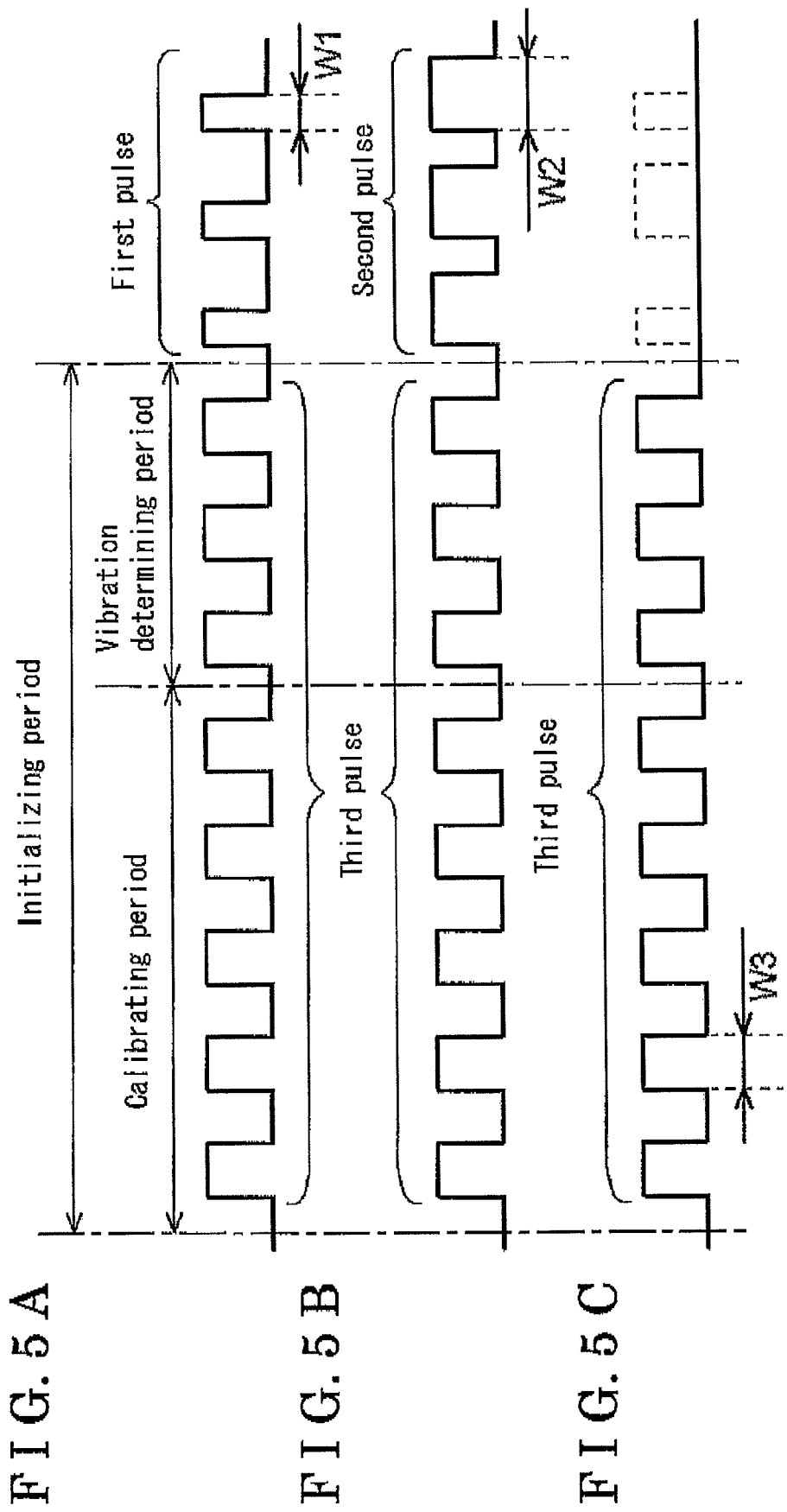

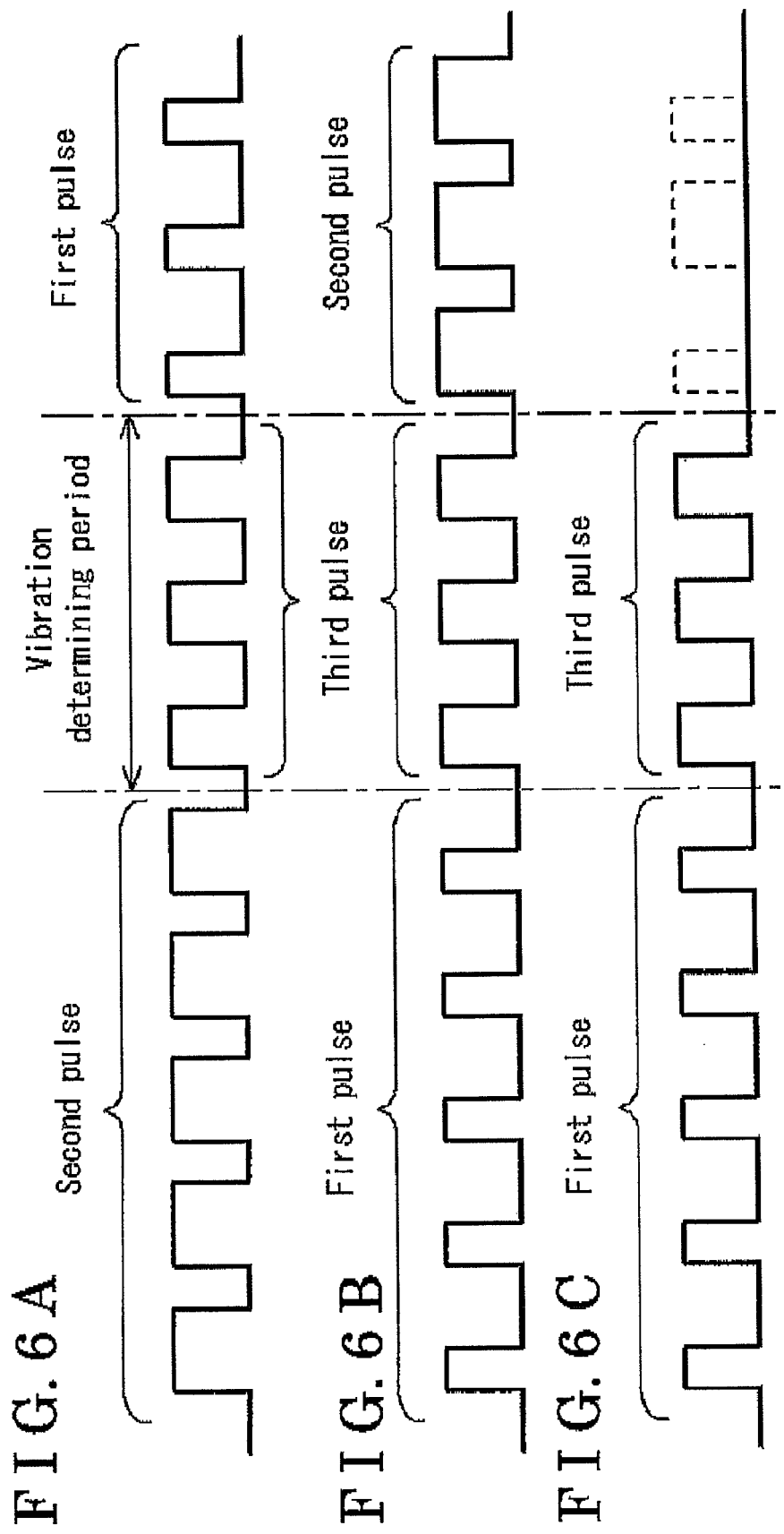

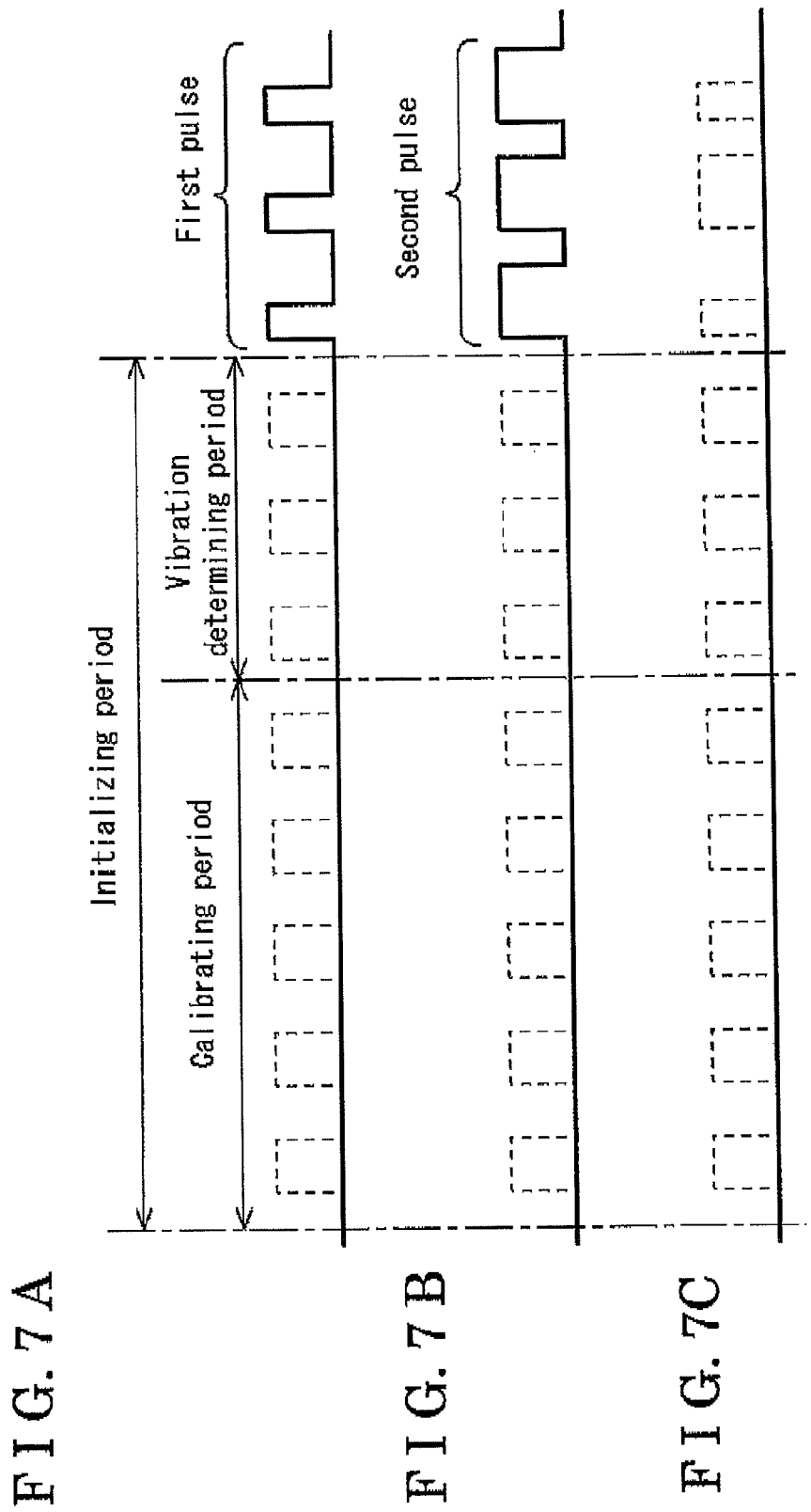

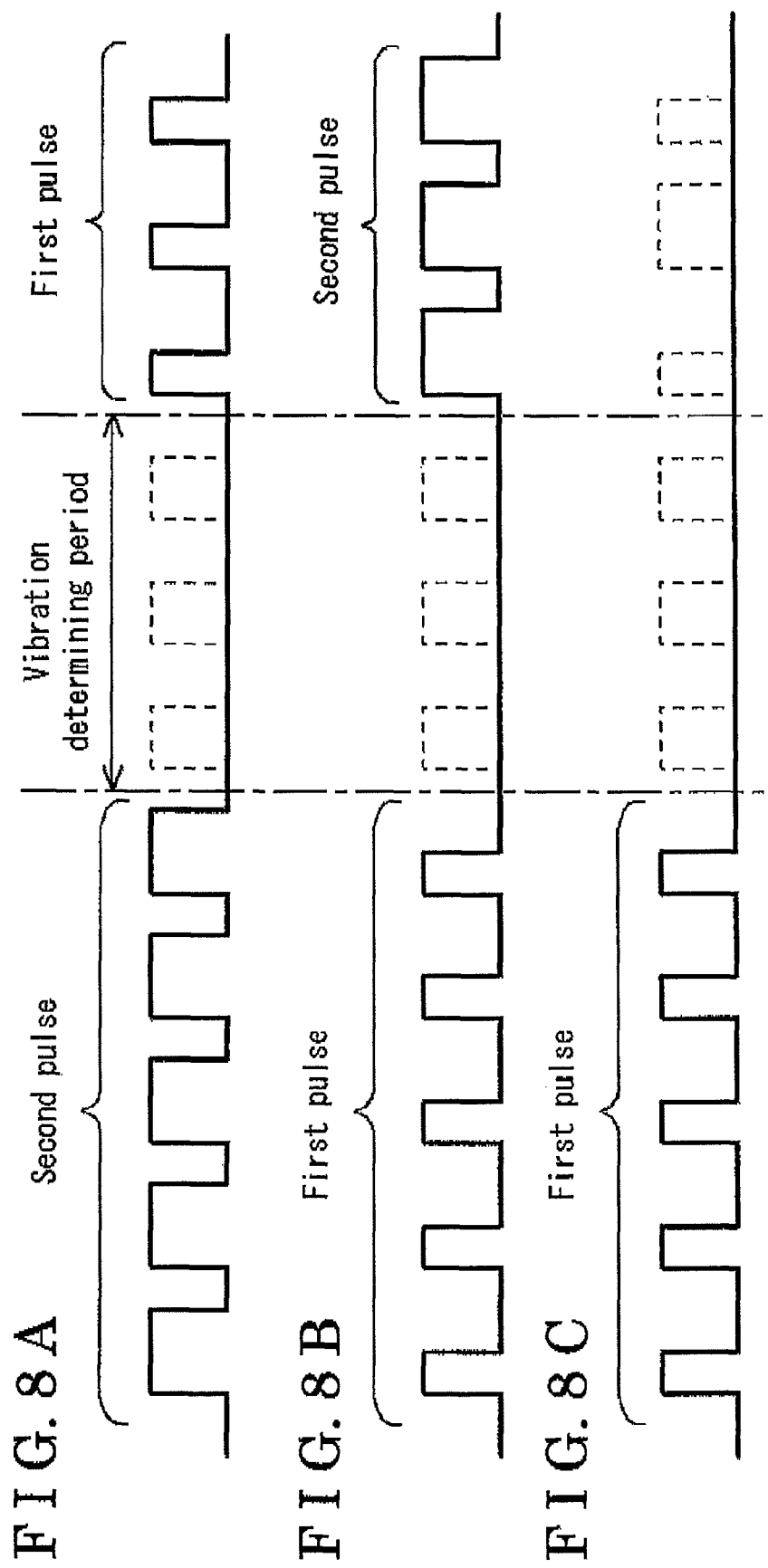

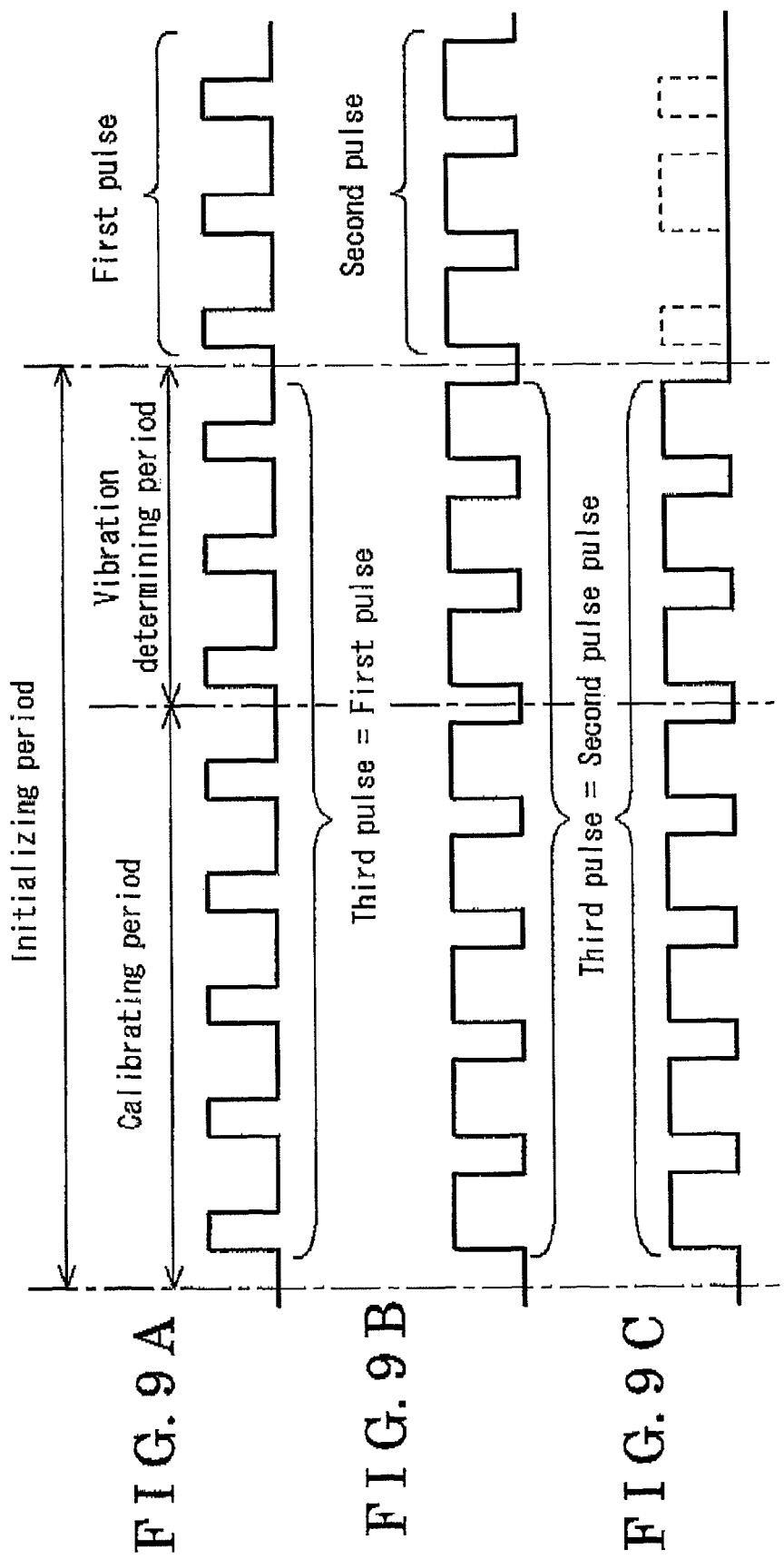

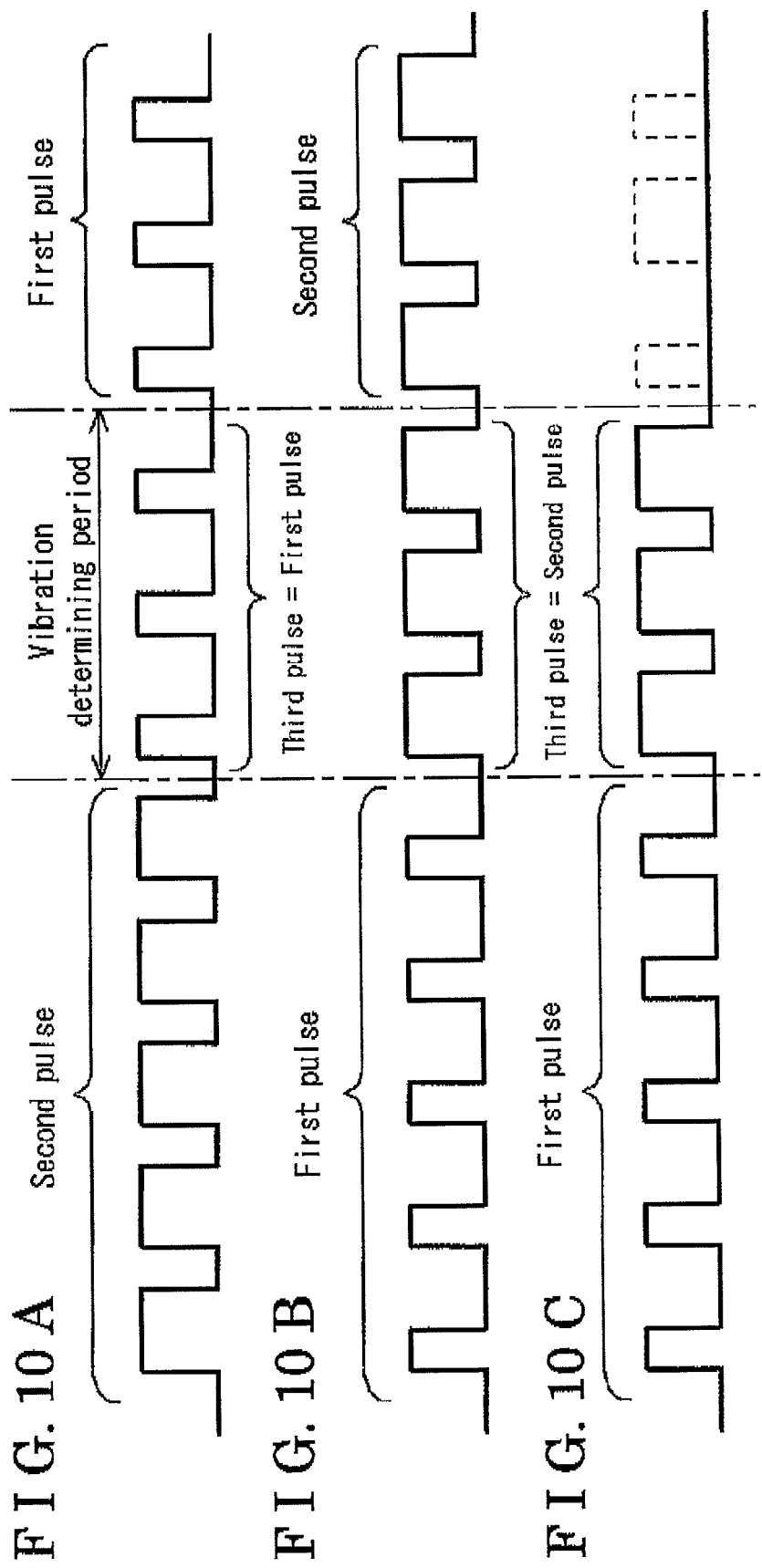

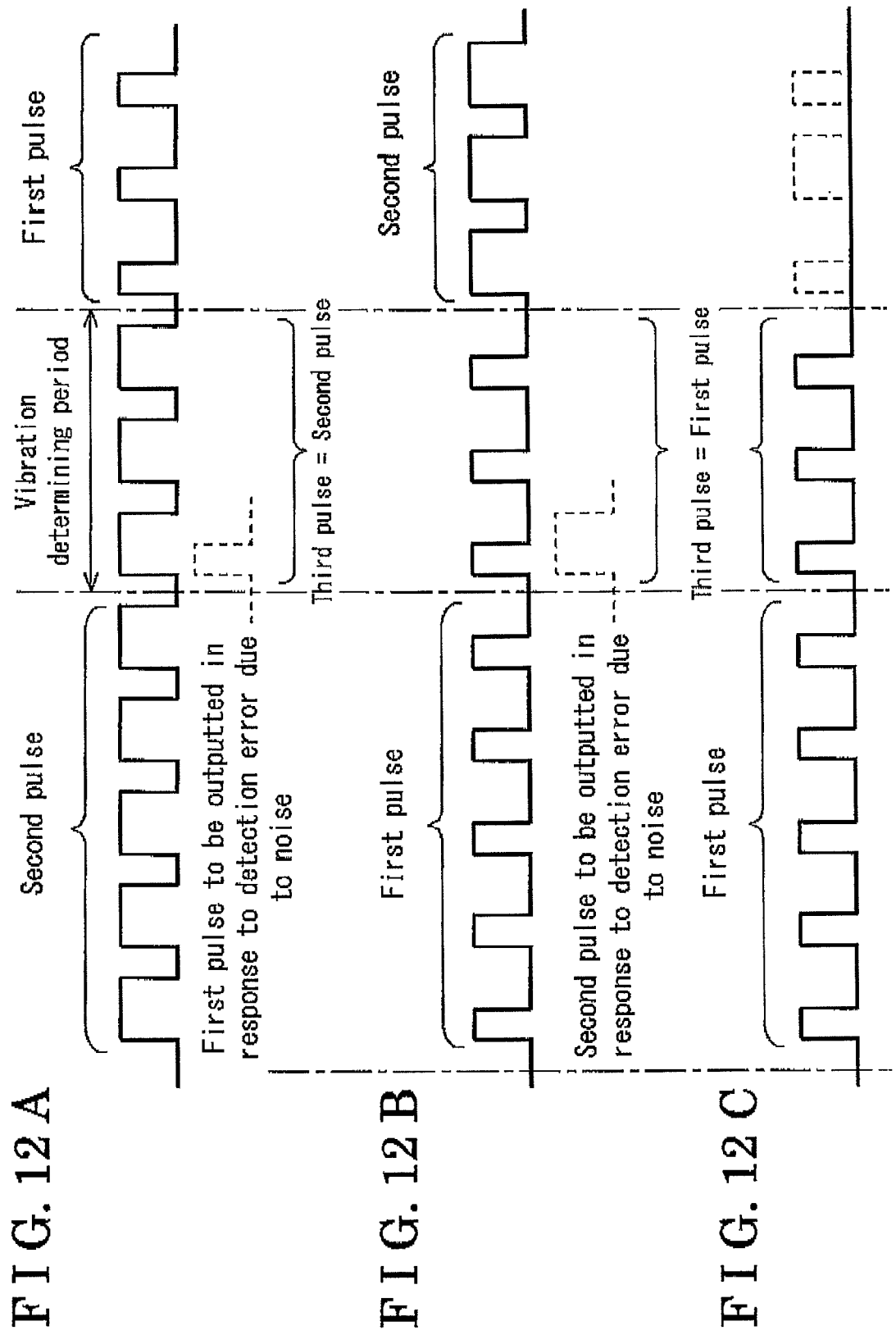

ROTATION SENSOR

CROSS REFERENCE TO RELATED APPLICATIONS

This application is based on and claims priority under 35 U.S.C. §119 to Japanese Patent Application 2008-187341, filed on Jul. 18, 2008, the entire content of which is incorporated herein by reference.

FIELD OF THE INVENTION

The present invention generally relates to a rotation sensor.

BACKGROUND

As an example of a rotation sensor, U.S. Pat. No. 7,046,000B1 (related to JP2006-145528A and referred to as reference 1 hereinafter) discloses a rotation sensor, which includes a detecting element detecting a rotation of a rotational member and accordingly outputting a detection signal and which outputs a pulse in response to the rotation of the rotational member on the basis of the detection signal outputted from the detecting element. The rotational member, of which rotation is to be detected by the rotation sensor, includes plural teeth at an outer circumferential portion thereof. The detecting element is structured with a Hall element, a magnetic resistance element, or the like. Such detecting element is disposed to face one of the teeth of the rotational member. When the rotational member rotates, each of the teeth of the rotational member sequentially moves relative to the detecting element. When each of the teeth moves relative to the detecting element, the detecting element outputs the detection signal in response to a rotational speed of the rotational member. The detection signal outputted from the detecting element is an analog signal, i.e., a sine waved signal. The rotation sensor further includes a pulse generating portion, which generates the pulse in response to the rotation of the rotational member on the basis of the detection signal, so that the rotation sensor is applicable to a digital circuit of a microcomputers, for example.

Such rotation sensor executes an initializing process, such as a gain adjustment and an offset adjustment, in an initializing period defined from a moment where a power supply voltage is inputted to a moment where a predetermined amplitude fluctuation is observed. Further, the rotation sensor is applicable to detect a rotation of a wheel of a vehicle, a rotation of a gear of a transmission, or the like. When the vehicle is in a stopped state, the wheel or the gear of the vehicle is in a non-rotating state. However, because a vehicle body vibrates in accordance with an engine vibration, a distance between the rotational member and the detecting element may periodically fluctuate. In the initializing period, the rotation sensor determines whether the periodic amplitude fluctuation is due to the vibration or due to the rotation of the rotational member, in addition to executing the initializing process.

Further, the rotation sensor may determine a rotational direction of the rotational member in the initializing period. As disclosed in U.S. Pat. No. 6,492,804B2 (related to JP2001-165951A and referred to as reference 2 hereinafter), when the rotational direction is determined, the rotation sensor outputs pulse signals having different waveforms in response to the determined rotational direction. The rotation sensor thus indicates the rotational direction of the rotational member. Because the rotational direction is determined not only when the power supply voltage is inputted but also when the rotational directions are switched, an adjustment period corresponding to the initializing period is set even when the rotational member rotates. Further, the vibration and the rotational direction of the rotational member are required to be detected even when the rotational member temporarily stops to rotate. Accordingly, the adjustment period corresponding to the initializing period is set also when the rotational member temporarily stops to rotate.

In such initializing period, the adjustment period and in a vibration determining period, the rotation sensor is set not to output the pulse signal, i.e., an output of the rotation sensor is masked. In recent years, the output of the rotation sensor is utilized to a control device for an ABS (anti-lock brake system), a control device for switching power sources of a hybrid vehicle, for example. Such control devices require to rapidly receive information regarding the rotation of the rotational member. Accordingly, even in a predetermined period such as the initializing period and the adjustment period where the rotation of the rotational member may not be detected, the rotation sensor is required to rapidly output such information regarding the rotation of the rotational member.

A need thus exists for a rotation sensor which is not susceptible to the drawback mentioned above.

SUMMARY OF THE INVENTION

According to an aspect of the present invention, a rotation sensor includes a detecting portion, a rotational state determining portion and a pulse generating portion. The detecting portion detects a rotation of a rotational member and outputs a detection signal. The rotational state determining portion determines a rotational state of the rotational member on the basis of the detection signal in a predetermined period. The pulse generating portion generates and outputs a first pulse and a second pulse, of which waveforms differ from each other, in response to a rotational direction of the rotational member after the predetermined period. The pulse generating portion further generates and outputs a third pulse regardless of the rotational state of the rotational member in the predetermined period.

BRIEF DESCRIPTION OF THE DRAWINGS

The foregoing and additional features and characteristics of the present invention will become more apparent from the following detailed description considered with the reference to the accompanying drawings, wherein:

FIG. 5A is a timing chart illustrating an example of a pulse output in the determining period according to the first embodiment;

FIG. 5B is a timing chart illustrating an example of the pulse output in the determining period according to the first embodiment;

FIG. 5C is a timing chart illustrating an example of the pulse output in the determining period according to the first embodiment;

FIG. 6A is a timing chart illustrating an example of the pulse output in the determining period according to the first embodiment;

FIG. 6B is a timing chart illustrating an example of the pulse output in the determining period according to the first embodiment;

FIG. 6C is a timing chart illustrating an example of the pulse output in the determining period according to the first embodiment;

FIG. 7A is a timing chart illustrating an example of a pulse output in a determining period according to a known rotation sensor;

FIG. 7B is a timing chart illustrating an example of the pulse output in the determining period according to the known rotation sensor;

FIG. 7C is a timing chart illustrating an example of the pulse output in the determining period according to the known rotation sensor;

FIG. 8A is a timing chart illustrating an example of the pulse output in the determining period according to the known rotation sensor;

FIG. 8B is a timing chart illustrating an example of the pulse output in the determining period according to the known rotation sensor;

FIG. 8C is a timing chart illustrating an example of the pulse output in the determining period according to the known rotation sensor;

FIG. 9A is a timing chart illustrating an example of the pulse output in the determining period according to the second embodiment;

FIG. 9B is a timing chart illustrating an example of the pulse output in the determining period according to the second embodiment;

FIG. 9C is a timing chart illustrating an example of the pulse output in the determining period according to the second embodiment;

FIG. 10A is a timing chart illustrating an example of the pulse output in the determining period according to the second embodiment;

FIG. 10B is a timing chart illustrating an example of the pulse output in the determining period according to the second embodiment;

FIG. 10C is a timing chart illustrating an example of the pulse output in the determining period according to the second embodiment;

FIG. 12A is a timing chart illustrating an example of the pulse output in the determining period according to the third embodiment;

FIG. 12B is a timing chart illustrating an example of the pulse output in the determining period according to the third embodiment; and FIG. 12C is a timing chart illustrating an example of the pulse output in the determining period according to the third embodiment.

DETAILED DESCRIPTION

Figure 1:
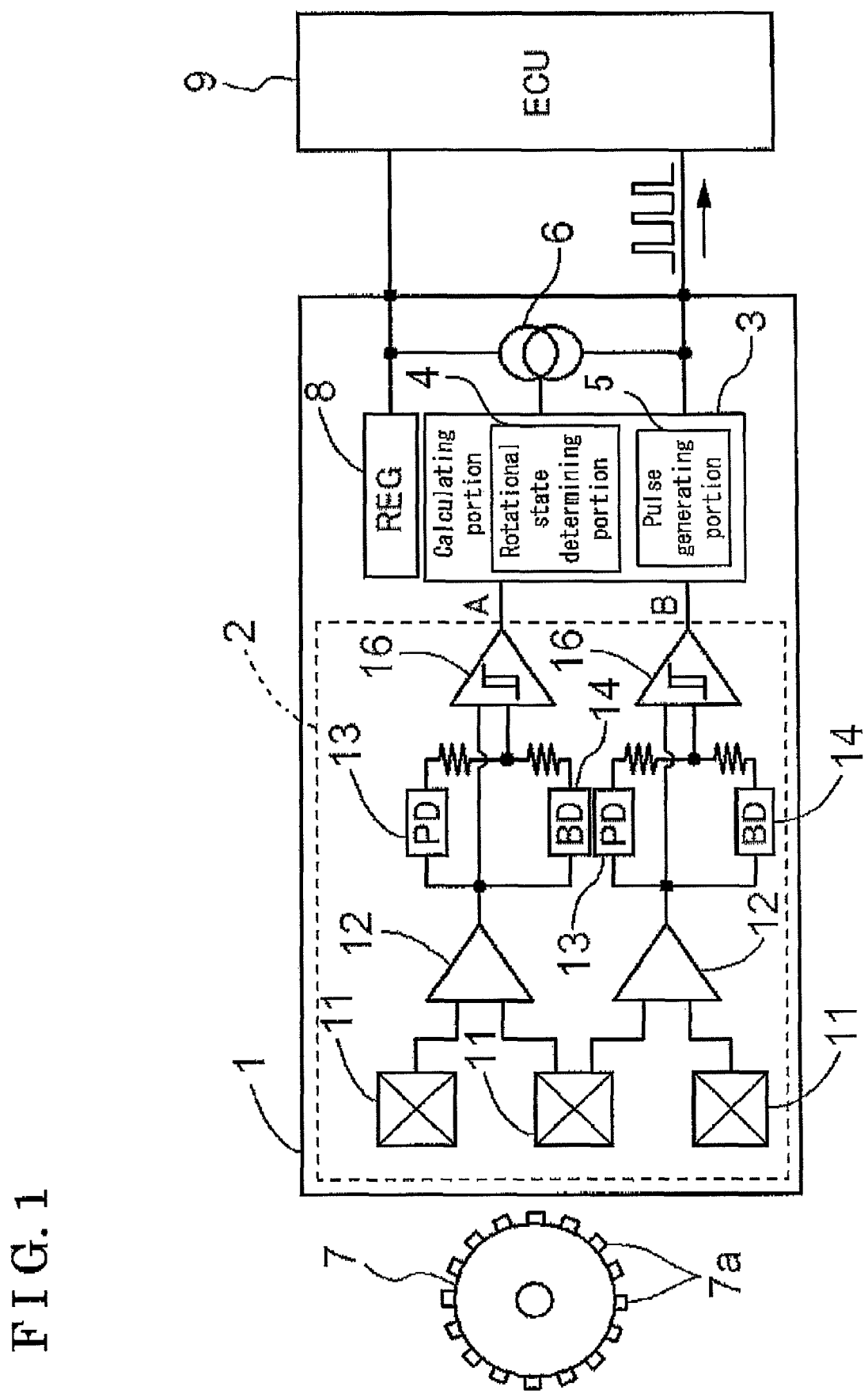
FIG. 1 is a block diagram schematically illustrating a structure of a rotational sensor according to first, second, and third embodiments.

A first embodiment of the present invention will be described below with reference to the attached drawings. As illustrated in FIG. 1, a rotation sensor 1 includes a detecting portion 2 and a calculating portion 3. The detecting portion 2 detects a rotation of a rotational member 7 and accordingly outputs detection signals A and B. The calculating portion 3 generates pulses In response to a rotational direction of the rotational member 7 on the basis of the detection signals A and B. The detecting portion 2 includes detecting elements 11, differential amplifiers 12, peak hold circuits (PD) 13, bottom hold circuits (BD) 14 and comparators 16. Each of the peak hold circuits 13 and the bottom hold circuits 14 is employed for setting a threshold value. The comparators 16 respectively generate the detection signals A and B on the basis of the set threshold value. The calculating portion 3 includes a rotational state determining portion 4 and a pulse generating portion 5. The rotational state determining portion 4 determines the rotational direction of the rotational member 7 on the basis of the detection signals A and B and also determines whether the rotational member 7 rotates or vibrates. The pulse generating portion 5 generates the pulses to be outputted on the basis of a result outputted by the rotational state determining portion 4.

According to the first embodiment, the rotation sensor 1 outputs the pulses as a current signal. With reference to FIG. 1, the reference numeral 6 indicates an output portion for outputting the pulses as the current signal, and the reference numeral 8 indicates an internal power supply of the rotation sensor 1. According to the first embodiment, a voltage regulator (REG) is employed as the internal power supply. The voltage regulator 8 generates a reference voltage on the basis of a power supply voltage which is supplied from an external power source of the rotation sensor 1. According to the first embodiment, an ECU (electronic control unit) 9 serves as the external power source of the rotation sensor 1. The ECU 9 receives an output of the rotation sensor 1, thereby executing various controls.

Each of the detecting elements 11 is structured with a Hall element, a magnetic resistance element, or the like. The rotational member 7 includes plural teeth 7a at an outer circumferential portion thereof. Each of the detecting elements 11 is disposed to face one of the teeth 7a of the rotational member 7. Each of the detecting elements 11 detects, at a detection surface thereof, a change of a magnetic flux generated in accordance with the rotation of the rotational member 7 and converts the detected magnetic flux into an electrical signal of which amplitude fluctuates in accordance with the rotation of the rotational member 7. According to the first embodiment, the rotation sensor 1 includes three detecting elements 11 (first, second and third detecting elements 11). The three detecting elements 11 structure two pairs of detecting elements 11 while commonly using one of the three detecting elements 11 between the two pairs, i.e., the first and second detecting elements 11 structure a first pair of detecting elements 11, while the second and third detecting elements 11 structure a second pair of detecting elements 11. The differential amplifiers 12, the peak hold circuits (PD) 13, the bottom hold circuits (BD) 14 and the comparators 16 are respectively connected to two pairs of the detecting elements 11. A difference between the outputs of the two detecting elements 11 structuring each pair is calculated by the corresponding differential amplifier 12.

The difference between the two detecting elements 11 structuring each pair is outputted by the corresponding differential amplifier 12 as a sine-waved analog signal. Then, the analog signal outputted by each differential amplifier 12 is inputted to the corresponding peak hold circuit (PD) 13 and the bottom hold circuit (BD) 14. The peak hold circuit (PD) 13 and the bottom hold circuit (BD) 14 measure a wave height value (peak-to-peak value) and then set the threshold value by dividing the voltage of the wave height value, for converting the sine-waved analog signal to the square shaped detection signals A and B. A threshold value setting method is disclosed in U.S. Pat. No. 7,046,000B1 (reference 1), for example, so that a detailed description of the threshold value setting method is omitted herein. Each of the comparators 16 includes a hysteresis. Further, the comparators 16 respectively convert the sine-waved analog signals to the square shaped detection signals A and B on the basis of the threshold values set by the peak hold circuits 13 and the bottom hold circuits 14.

An initializing process, such as an offset adjustment for offsetting an amplifying factor of each differential amplifier 12 and the threshold value to be used in each comparator 16, is executed in an initializing period i (specifically in a calibrating period c) which is set when a power supply voltage is inputted to the rotation sensor 1, as will be described below in detail.

Figure 2A:
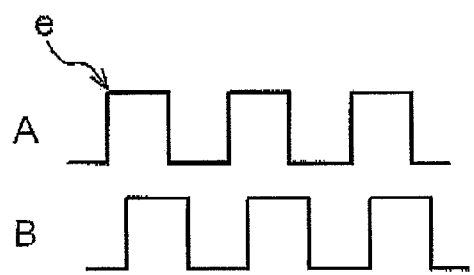
FIG. 2A is an explanatory view for indicating a process to detect a rotational direction of a rotational member, illustrating detection signals outputted when the rotational member rotates in a first rotational direction.
Figure 2B:
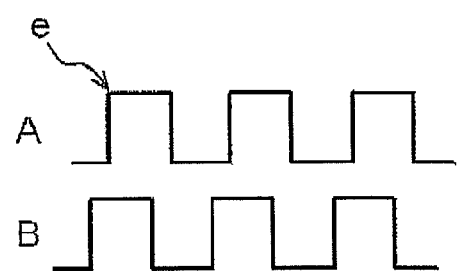
FIG. 2B is an explanatory view for indicating the process to detect the rotational direction of the rotational member, illustrating the detection signals outputted when the rotational member rotates in a second rotational direction.

Each detecting element 11 is disposed while being distant from the each adjacent detecting element 11 by a quarter of a pitch of the teeth 7a of the rotational member 7. Accordingly, as illustrated in FIGS. 2A and 2B, a phase of the detection signal A and a phase of the detection signal B are deviated from each other by a quarter of the phases. Herein, a raising point of the square shaped wave of the detection signal A is assigned as an edge e, for example. As illustrated in FIG. 2A, in a condition where the phase of the detection signal A precedes the phase of the detection signal B, the detection signal B is in a low level at a point corresponding to the edge e of the detection signal A. On the other hand, as illustrated in FIG. 2B, in a condition where the phase of the detection signal B precedes the phase of the detection signal A, the detection signal B is in a high level at the point corresponding to the edge e of the detection signal A. Thus, with reference to an edge of one of the detection signals A and B (according to the embodiment, the edge e of the detection signal A), a relationship between the phases of the detection signals A and B is obtained, and the rotational direction of the rotational member 7 is accordingly detected on the basis of the relationship between the phases of the detection signals A and B.

Figure 3:
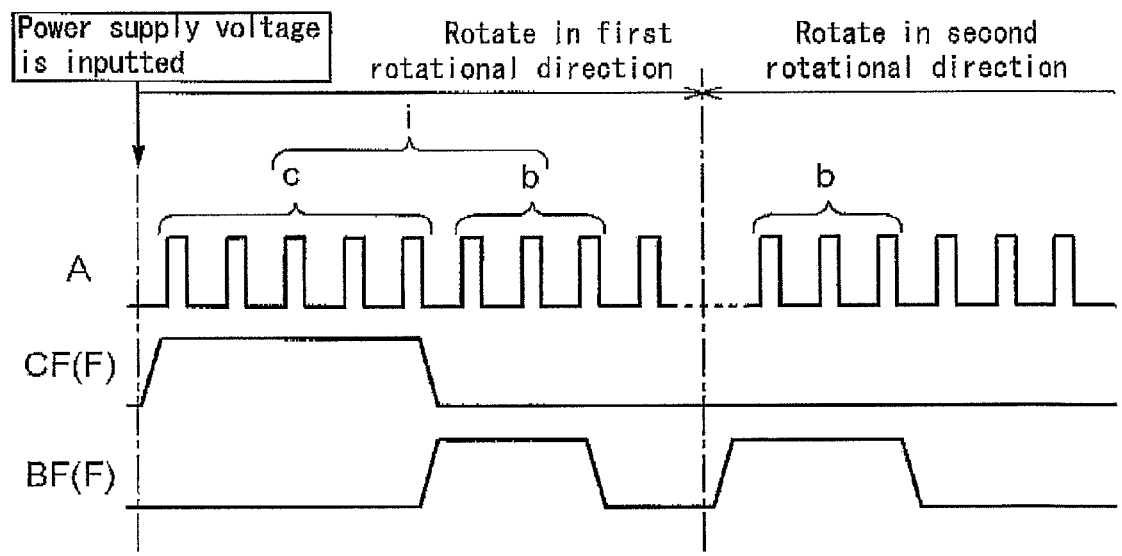
FIG. 3 is a timing chart illustrating a process to determine a rotational state of the rotational member in a determining period.
Figure 4:
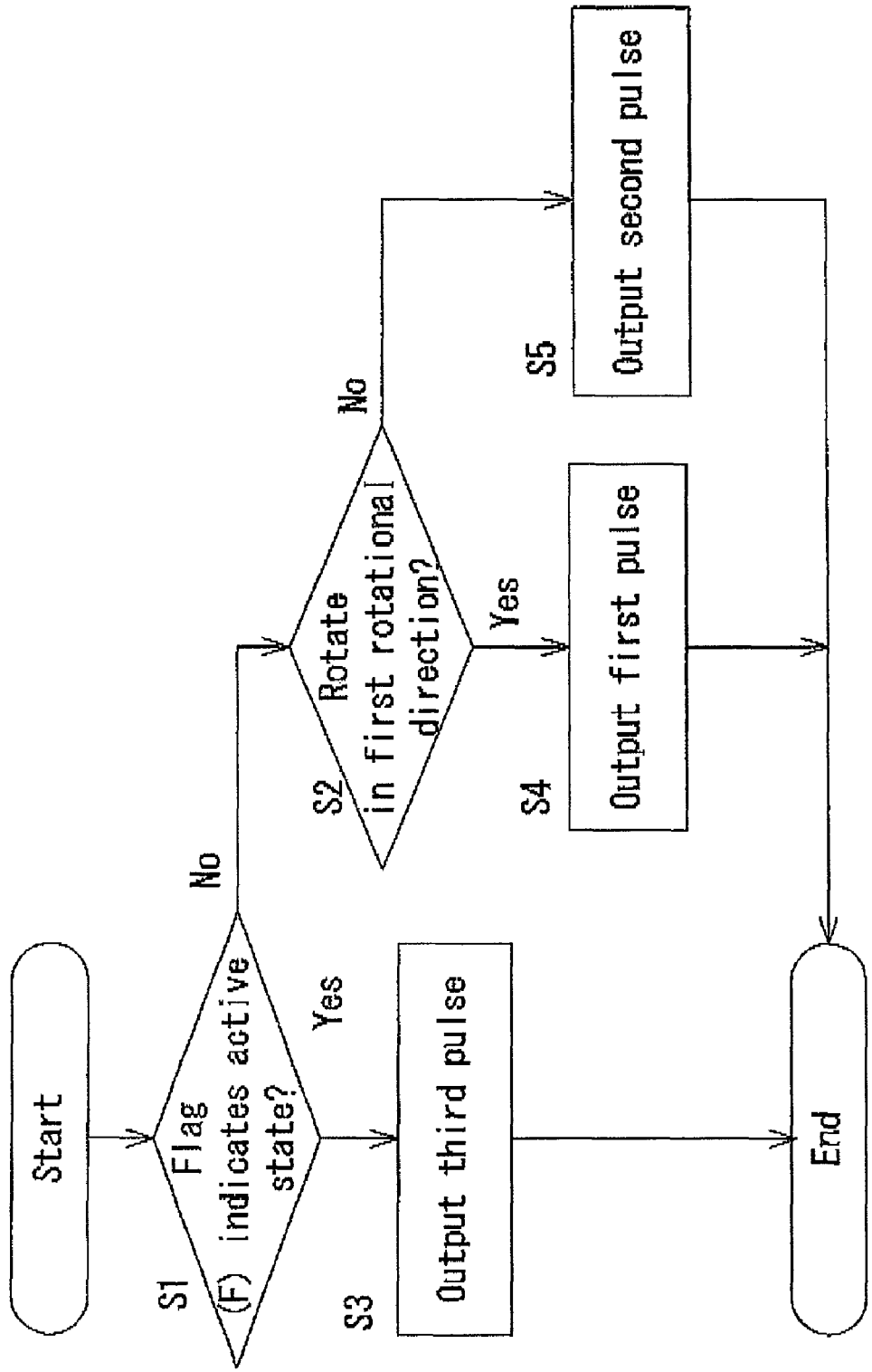
FIG. 4 is a flowchart illustrating the process to determine the rotational state of the rotational member in the determining period.
Figures 11A, 11B, 11C:
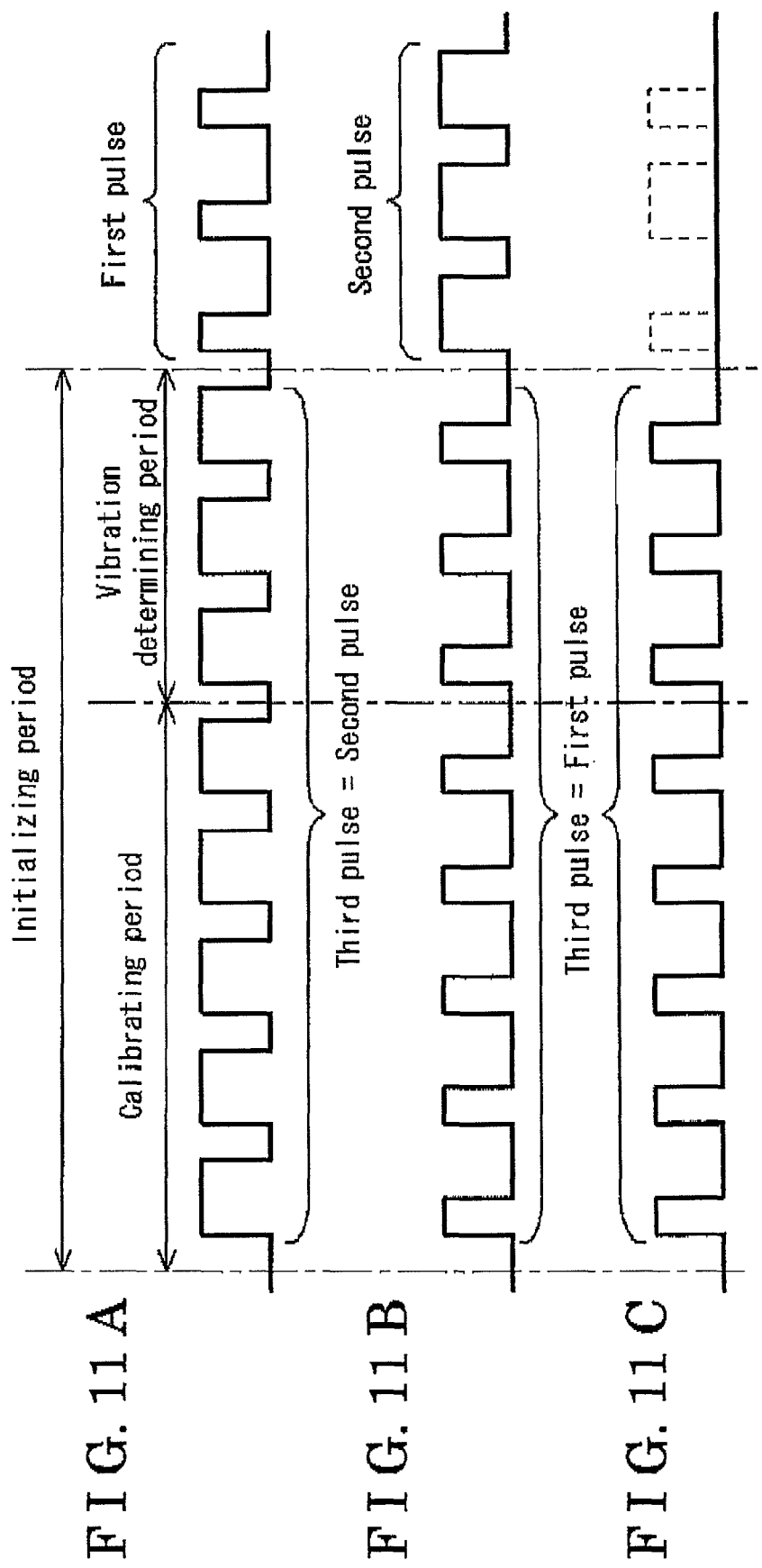
FIG. 11A is a timing chart illustrating an example of the pulse output in the determining period according to the third embodiment.
FIG. 11B is a timing chart illustrating an example of the pulse output in the determining period according to the third embodiment.
FIG. 11C is a timing chart illustrating an example of the pulse output in the determining period according to the third embodiment.

As illustrated in FIG. 3, a determining period (serving as a predetermined period) includes the initializing period i, in which the initializing process is executed immediately after the power supply voltage is inputted. The determining period further includes a vibration determining period b, in which whether the rotational member 7 rotates or vibrates without rotating is determined. According to the first embodiment, the initializing period i includes the calibrating period c and the vibration determining period b. In the calibrating period (adjusting period) c, an initial setting of the amplification factor, the threshold value, and the like, of the detecting portion 2 are adjusted for detecting the rotational direction of the rotational member 7. Further, according to the first embodiment, the vibration determining period b is also set in a condition where the rotational directions of the rotational member 7 are switched.

The calibrating period c ranges five pulses of the detection signal A (and/or the detection signal B), for example. In the calibrating period c, the detecting portion 2 executes the initial setting of the amplification factor, and the rotational state determining portion 4 accordingly detects the rotational direction of the rotational member 7. In the calibrating period c, a calibration flag CF of a flag F indicates an active state thereof.

The vibration determining period b ranges three pulses of the detection signal A (and the detection signal B), for example. Thus, according to the first embodiment, the initializing period i totally ranges 8 pulses of the detection signal A (and/or the detection signal B). In the vibration determining period b, the rotational state determining portion 4 determines whether or not three rotations of the rotational member 7 in the same direction are sequentially detected. Specifically, the rotational state determining portion 4 determines whether or not one of a first rotation cycle (normal rotation cycle) and a second rotation cycle (which is a reverse rotation cycle relative to the first rotation cycle) is repeated sequentially for three times. In a condition where one of the first rotation cycle and the second rotation cycle is not repeated sequentially for three times, the rotational state determining portion 4 determines that the rotational member 7 vibrates in a stopped state without rotating (non-rotating state). In the vibration determining period b, a vibration flag BF of the flag F indicates an active state thereof. The vibration determining period b, which is to be provided when the rotational directions of the rotational member 7 are switched (not when the power supply voltage is inputted), is set in a condition where the cycle of output pulse is longer than a predetermined time and/or in a condition where detection result does not show the continuity of the rotation of the rotational member 7 in the same rotational direction.

Hereinafter, a process to determine the rotational state of the rotational member 7 in the determining period (i, c, b), and examples of the pulse output in the determining period according to the first embodiment will be described with reference to FIGS. 4, 5A-5C and 6A-6C.

First, the calculating portion 3 (specifically, the rotational state determining portion 4) determines whether or not the flag F (i.e., the calibration flag CF and the vibration determination flag BF) is in the active state, i.e., whether or not the flag F is in the active state (Step S1). In a condition where the flag F is not in the active state, the rotational direction of the rotational member 7 is determined on the basis of the detection signals A and B as described above (Step S2). Then, in a condition where the rotational state determining portion 4 determines that the rotational member 7 rotates in a first rotational direction (normal rotational direction), a first pulse (normal rotation pulse) is outputted as illustrated in FIGS. 5A and 6A after the determining period (i, c, b) elapses (Step S4). On the other hand, in a condition where the rotational state determining portion 4 determines that the rotational member 7 rotates in a second rotational direction (which is a reverse rotational direction relative to the first rotational direction), a second pulse (reverse rotation pulse) is outputted as illustrated in FIGS. 5B and 6B after the determining period (i, c, b) elapses (Step S5). In other words, the pulse generating portion 5 generates one of the first pulse and the second pulse, of which waveforms differ from each other, on the basis of the determination result of the rotational state determining portion 4 in response to the rotational direction of the rotational member 7 after the determining period (i, c, b) elapses and then outputs the one of the first and second pulses via the output portion 6.

In a condition where the rotational direction of the rotational member 7 is not specifically determined, i.e., for example in a condition where the rotational state determining portion 4 does not detect that one of the first and second rotation cycles is repeated sequentially for three times, the pulse generating portion 5 does not output any of the first pulse and the second pulse as illustrated in FIGS. 5C and 6C.

According to the first embodiment, the first pulse and the second pulse are outputted as signals having different pulse width. Specifically, according to the first embodiment, the pulse width of the first pulse is indicated as W1, while the pulse width of the second pulse is indicated as W2. In order to simplify the description hereinafter, the pulse width W1 is assigned as 50 μs, while the pulse width W2 is assigned as 100 μs. In a condition where a wheel of the vehicle is employed as the rotational member 7, the frequency of the output pulse is set to 3-5 kHz. In a condition where a gear of an automatic transmission is employed as the rotational member 7, the frequency of the output pulse is set to 5-10 kHz.

In a condition where the rotational state determining portion 4 determines that the Flag F is in the active state in Step S1, the first pulse is outputted as illustrated in FIGS. 5A-5C and 6A-6C (Step S3). The pulse generating portion 5 generates the third pulse in the determining period (i, c, b) regardless of the rotational state of the rotational member 7 and outputs the third pulse through the output portion 6. The third pulse is generated and outputted synchronously with the detection signal A (or the detection signal B). Accordingly, although the third pulse does not include information regarding the rotational direction of the rotational member 7, the third pulse essentially includes information regarding a rotational speed of the rotational member 7 in the same manner as the first and second pulses. According to the first embodiment, the waveform of the third pulse differs from the waveform of each of the first and second pulses. The pulse width of the third pulse is indicated as W3. Hereinafter, in order to simplify the description, the pulse width W3 is assigned as 75 μs.

According to the first embodiment, because the pulse width W3 of the third pulse differs from each of the pulse widths W1 and W2, the waveform of the third pulse differs from the waveform of each of the first and second pulses. However, the invention is not construed as limited to this embodiment. For example, the third pulse may include an amplitude (wave height) which differs from that of each of the first and second pulses. Further, the waveform of the third pulse is not limited to the square shape. Alternatively, the third pulse may include a synthesized waveform by combining plural square shaped waves of which wave heights differ from each other.

FIGS. 7A-7C and 8A-8C are timing charts each illustrating an example of a pulse output in a determining period according to a known rotation sensor (i.e., FIGS. 7A-7C and 8A-8C respectively correspond to FIGS. 5A-5C and 6A-6C according to the first embodiment). As illustrated in FIGS. 7A-7C and 8A-8C, according to the known rotation sensor, any pulse is not outputted in the determining period including the initializing period i, the calibrating period c and the vibration detecting period b. Accordingly, in the determining period, information regarding a rotational state of a rotational member (specifically including information whether the rotational member vibrates or rotates) is not inputted to an ECU. To the contrary, according to the first embodiment, because the third pulse is outputted, the ECU 9 receives the Information regarding the rotational state of the rotational member 7 even in the determining period (i, c, b).

In the condition where the rotational member 7 rotates in one of the first and second rotational directions without being in a vibrating state, a gain adjustment and an offset adjustment may be completed in an early time in the initializing period i. Accordingly, in such condition, the third pulse is outputted as a signal substantially accurately indicating at least the rotational speed of the rotational member 7. The ECU 9 receiving the third pulse estimates the rotational state of the rotational member 7 on the basis of the third pulse even in the determining period (i, c, b) of the rotation sensor 1. In recent years, the output of the rotation sensor 1 is utilized for a control device of an ABS (anti-lock brake system) and for a control device for switching power sources of a hybrid vehicle, for example. Accordingly, such control devices requires to rapidly receive the information regarding the rotation of the rotational member 7. According to the first embodiment, the control device (ECU 9) rapidly receives such information regarding the rotation of the rotational member 7 because of the third pulse.

As described above, the third pulse is generated and outputted synchronously with the detection signal A (or the detection signal B). In other words, in a condition where the rotational member 7 is in a fully stopped state without rotating or vibrating and the detecting elements 11 do not detect any physical change, the third pulse is not necessarily outputted. However, even in such condition, the calculating portion 3 may generate and output a predetermined pulse without being interfered.

A second embodiment of the present invention will be described hereinbelow. According to the first embodiment, the waveform of the third pulse differs from the waveform of each of the first pulse and the second pulse. However, the third pulse may include the same wave from as one of the first and second pulses. Hereinafter, examples of the pulse output in the determining period (i, c, b) according to the second embodiment will be described with reference to FIGS. 9A-9C and 10A-10C.

In the same manner as the first embodiment, first, when the calculating portion 3 (specifically, the rotational state determining portion 4) determines that the flag F is in the active state in Step S1, the third pulse is outputted (Step S3) as illustrated in FIGS. 9A-9C and 10A-10C. Then, the pulse generating portion 5 generates the third pulse in the determining period (i, c, b) regardless of the rotational state of the rotational member 7 and outputs the third pulse via the outputting portion 6. According to the second embodiment, the third pulse includes the same waveform as one of the first and second pulses. Specifically, the third pulse is arranged to include the same waveform as a pulse outputted in response to an initially determined rotational direction.

The third pulse is outputted in a condition where the rotational state and the vibration state of the rotational member 7 are not determined. In other words, the third pulse is 6 outputted regardless of the rotational state of the rotational member 7, Accordingly; although the initially determined rotational direction in the determining period (i, c, b) may not be accurate, the waveform of the third pulse is determined in an early time of the determining period (i, c, b). Thus, the third pulse is appropriately outputted over the entire determining period (i, c, b).

Further, even in the condition where the third pulse does not accurately indicate the rotational direction of the rotational member 7, at least the rotational speed of the rotational member 7 is outputted in the determining period (i, c, b) and an accurate pulse (first or second pulse) is outputted after the determining period (i, c, b) elapses. Further, in the condition where the rotational member 7 normally rotates in one of the first and second rotational directions, the accurate rotational direction of the rotational member 7 is determined, with high possibility, in the early time of the determining period (i, c, b). In such condition, the rotation sensor 1 outputs the pulse (first or second pulse) in response to the rotational direction of the rotational member 7 in an early stage. The ECU 9, which is configured to use the output of the rotation sensor 1, estimates the rotational state of the rotational member 7 on the basis of the third pulse so as to start a predetermined control in response to the rotational state of the rotational member 7.

As illustrated in FIGS. 7A-7C and 8A-8C, the known rotation sensor does not output any pulse in the determining period (in the initializing period i, the calibrating period c, and the vibration detecting period b, for example). Thus, in the determining period, the information regarding the rotational state of the rotational member (specifically including information whether the rotational member rotates or vibrates) is not inputted to the ECU. To the contrary, according to the second embodiment, because the third pulse is outputted, the ECU 9 receives the information regarding at least the rotational speed of the rotational member 7 even in the determining period (i, c, b). Further, according to the second embodiment, because the pulse (the third pulse) is outputted in response to the initially determined rotational direction in of the determining period (i, c, b), the ECU 9 estimates the rotational state of the rotational member 7 on the basis of the third pulse so as to start the predetermined control in response to the rotational state of the rotational member 7. The output of the rotation sensor 1 is utilized for a control device of an ABS (anti-lock brake system) and for a control device for switching power sources of a hybrid vehicle. Accordingly, such control device requires to rapidly receive the information regarding the rotation of the rotational member 7. According to the second embodiment, the control device (ECU 9) rapidly receives such information regarding the rotation of the rotational member 7 because of the third pulse.

A third embodiment will be described hereinbelow with reference to FIGS. 11A-11C and 12A-12C. According to the second embodiment, the third pulse includes the same waveform as one of the first and second pulses. Specifically, according to the second embodiment, the third pulse is arranged to include the same waveform as the pulse outputted in response to the initially determined rotational direction. However, the third pulse may include the same waveform as a pulse outputted in response to a rotational direction opposite to the initially determined rotational direction. Hereinafter, examples of the pulse output in the determining period (i, c, b) according to the third embodiment will be described with reference to FIGS. 11A-11C and 12A-12C.

In the same manner as the first and second embodiments, first, when the calculating portion 3 (specifically, the rotational state determining portion 4) determines that the flag F is in the active state in Step S1, the third pulse is outputted (Step S3) as illustrated in FIGS. 11A-11C and 12A-12C. Then, the pulse generating portion 5 generates the third pulse in the determining period (i, c, b) regardless of the rotational state of the rotational member 7 and outputs the third pulse via the outputting portion 6. According to the third embodiment, the third pulse includes the same waveform as one of the first and second pulses. Specifically, the third pulse is arranged to include the same waveform as the pulse outputted in response to the rotational direction opposite to the initially determined rotational direction. In the same manner as the second embodiment, the third pulse is outputted in the condition where the rotational state and the vibration state of the rotational member 7 is not determined. Accordingly, although the third pulse includes the same waveform as one of the first and second pulses, the third pulse is outputted regardless of the rotational state of the rotational member 7.

In the condition where the rotational member 7 normally rotates in one of the first and second rotational directions, the accurate rotational direction is determined, with high possibility, in the early time of the determining period (i, c, b). Specifically, in the condition where the initially determined rotational direction in the determining period (i, c, b) is accurate, a pulse which is different from the third pulse (i.e., the first or second pulse) is outputted after the determining period (i, c, b) elapses. Thus, the rotation sensor 1 outputs one of the first to third pulses while distinguishing the determining period (i, c, b) and a time after the determining period.

The initially determined rotational direction in the determining period (i, c, b) may not surely be accurate. In other words, the rotation sensor 1 may not surely output one of the first to third pulses while distinguishing the determining period (i, c, b) and the time after the determining period. However, according to the third embodiment, because the waveform of the third pulse is determined in the early time of the determining period (i, c, b), the third pulse is appropriately outputted over the entire determining period (i, c, b). Thus, even in the determining period (i, c, b), the ECU 9 receives information including at least the rotational speed of the rotational member 7. The ECU 9 estimates the rotational state of the rotational member 7 on the basis of the third pulse so as to start the predetermined control in response to the rotational state of the rotational member 7.

On the other hand, in a condition where the rotational member 7 is in the stopped state or in a condition where the rotational member 7 rotates at low speed (approximately-stopped state), the detecting portion 2 may detect, at high possibility, a noise component due to vibration or the like rather than detecting the rotation of the rotational member 7. According to the third embodiment, even in the condition where the rotational member 7 is in the stopped state or in the approximately-stopped state, the rotation sensor 1 outputs the pulse (the third pulse) in response to the rotational direction opposite to the initially determined rotational direction in the determining period (i, c, b), i.e., specifically, in response to a rotational direction opposite to a rotational direction which is determined on the basis of a initially outputted detection signal A or B, for example. Accordingly, the rotation sensor 1 outputs the pulse (first or second pulse) in response to the rotational direction at the early stage while restraining an influence of a detection result due to vibration fluctuation of such noise.

As described above, an effect where the determining period (i, c, b) and the time after the determining period are accurately distinguished is obtained in the second embodiment, while an effect where the influence of the detection result due to the vibration fluctuation of noise is restrained is obtained in the third embodiment. The rotation sensor 1 is configured to suit an environment where a device including the rotation sensor 1 is applied and/or to suit a usage manner of the rotation sensor 1 in order to obtain one of such effects. According to the first to third embodiments, the rotation sensor 1 outputs the third pulse, which is the signal substantially accurately indicating at least the rotational speed of the rotational member 1, in the determining period (i, c, b). Accordingly, the waveform of the third pulse may be predetermined so as to suit the environment where the rotation sensor 1 is applied and/or the usage manner of the rotation sensor 1.

Thus, according to the first to third embodiments, the rotation sensor 1 rapidly outputs the pulse (the third pulse) in response to the rotation of the rotational member 7 even in the determining period (i, c, b) including the initializing period i.

Specifically, according to the first to third embodiments, the third pulse includes the information regarding the rotational speed of the rotational member 7.

The determining period (the predetermined period) includes the vibration determining period b. The rotational state determining portion 4 determines whether the rotational member 7 rotates or vibrates without rotating in the vibration determining period b. The pulse generating portion 5 generates and outputs the third pulse in the vibration determining period b. When the rotational state determining portion 4 determines that the rotational member 7 rotates in the vibration determining period b, the pulse generating portion 5 generates and outputs one of the first pulse and the second pulse in response to the rotational direction of the rotational member 7 after the vibration determining period b elapses.

Further, the determining period (the predetermined period) includes the initializing period i having the calibrating period c and the vibration determining period b. The pulse generating portion 5 generates and outputs the third pulse in the initializing period c.

In a condition where any pulse is outputted in the determining period (i, c, b), the rotation sensor 1 may not detect the rotational state of the rotational member 7 (specifically, whether the rotational member rotates or vibrates) in the determining period (i, c, b). However, according to the first to third embodiments, the external portion (the ECU 9) receives the information regarding the rotational state of the rotational member 7 even in the determining period (i, c, b) because the third pulse is outputted in the determining period (i, c, b). For example in the condition where the rotational member 7 rotates in one of the first and second rotational directions without being in the vibrating state, the initializing process such as the gain adjustment and the offset adjustment may be completed in the early time of the determining period (i, c, b). Accordingly, the third pulse is outputted as a signal substantially accurately indicating at least the rotational speed of the rotational member 7. Thus, according to the first to third embodiments, the rotation sensor 1 rapidly outputs the pulse (third pulse) in response to the rotation of the rotational member 7 even in the determining period (i, c, b) including the initializing period i. In a condition where the rotation sensor 1 is applied to a vehicle, the output of the rotation sensor 1 is adapted to be utilized to a control device of an ABS (anti-lock brake system) and a control device for switching power sources of a hybrid type vehicle. Accordingly, such control devices require to rapidly receive the information regarding the rotation of the rotational member 7. According to the first to third embodiments, the control device (ECU 9) rapidly receives such information regarding the rotation of the rotational member 7 because of the third pulse.

According to the first embodiment, the waveform of the third pulse differs from the waveform of each of the first pulse and the second pulse.

Further, according to the second embodiment, the third pulse includes the same waveform as one of the first and second pulses, which is outputted in response to the initially determined rotational direction of the rotational member 7 in the determining period (i, c, b).

The third pulse is outputted in the condition where the rotational direction of the rotational member 7 may not be accurately determined. In other words, the third pulse is outputted regardless of the rotational state of the rotational member 7. Accordingly, although the initially determined rotational direction in the determining period (i, c, b) may not be accurate, the waveform of the third pulse is determined in the early time of the determining period (i, c, b). Thus, the third pulse is appropriately outputted over the entire determining period (i, c, b). Further, even in the condition where the third pulse does not accurately indicate the rotational direction of the rotational member 7, at least the rotational speed of the rotational member 7 is outputted in the determining period (i, c, b) and an accurate pulse (first or second pulse) is outputted after the determining period (i, c, b) elapses. Still further, in the condition where the rotational member 7 normally rotates in one of the first and second rotational directions, the accurate rotational direction of the rotational member 7 is determined, with high possibility, in the early time of the determining period (i, c, b). In such condition, the rotation sensor 1 outputs the pulse in response to the rotational direction of the rotational member 7 in the early stage. The control device (such as the ECU 9), which is configured to utilize the output of the rotation sensor 1, estimates the rotational state of the rotational member 7 on the basis of the third pulse so as to start a predetermined control in response to the rotational state of the rotational member 7.

According to the third embodiment, the third pulse includes the same waveform as one of the first and second pulses, which is outputted in response to the rotational direction opposite to the initially determined rotational direction of the rotational member 7 in the determining period (i, c, b).

As described above, because the third pulse is outputted in the condition where the rotational direction of the rotational member 7 may not be accurately determined, i.e., the third pulse is outputted regardless of the rotational state of the rotational member 7. In the condition where the initially determined rotational direction in the determining period (i, c, b) is accurate, the pulse which is different from the third pulse (i.e., the first or second pulse) is outputted after the determining period (i, c, b) elapses. Accordingly, the rotation sensor 1 outputs one of the first to third pulses while distinguishing the determining period (i, c, b) and the time after the determining period. As described above, the initially determined rotational direction in the determining period (i, c, b) may not surely be accurate. However, according to the third embodiment, because the waveform of the third pulse is determined in the early time of the determining period (i, c, b), the third pulse is appropriately outputted over the entire determining period (i, c, b). Thus, the control device (such as the ECU 9) receives the information including at least the rotational speed of the rotational member 7 even in the determining period (i, c, b).

In the condition where the rotational member 7 is in the stopped state or in the condition where the rotational member 7 rotates at low speed (the approximately-stopped state), the detecting portion 2 may detect, at high possibility, a noise component for example due to the vibration of the rotational member 7 rather than detecting the rotation of the rotational member 7. According to the third embodiment, even in the condition where the rotational member 7 is in the stopped state or in the approximately-stopped state, the rotation sensor 1 outputs the pulse (the third pulse) in response to the rotational direction opposite to the initially determined rotational direction in the determining period (i, c, b), for example. Accordingly, the rotation sensor 1 outputs the pulse (first or second pulse) in response to the rotational direction at the early stage while restraining the influence of the detection result due to the vibration fluctuation of such noise. The rotation sensor 1 is configured to suit the environment where the rotation sensor 1 is applied and/or to suit the usage manner of the rotation sensor 1 in order to obtain one of the above described effects The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A rotation sensor, comprising:
a detecting portion detecting a rotation of a rotational member and outputting a detection signal;
a rotational state determining portion determining a rotational state of the rotational member on the basis of the detection signal in a predetermined period; and
a pulse generating portion generating and outputting a first pulse and a second pulse, of which waveforms differ from each other, after the predetermined period, the first pulse being generated and outputted in response to a first rotational direction of the rotational member, and the second pulse being generated and outputted in response to a second rotational direction of the rotational member; the pulse generating portion further generating and outputting a third pulse regardless of the rotational state of the rotational member in the predetermined period.

2. A rotation sensor according to claim 1, wherein
a waveform of the third pulse differs from a waveform of each of the first pulse and the second pulse.

3. A rotation sensor according to claim 1, wherein
the third pulse includes the same waveform as one of the first and second pulses, which is outputted in response to an initially determined rotational direction of the rotational member in the predetermined period.

4. A rotation sensor according to claim 1, wherein
the third pulse includes the same waveform as one of the first and second pulses, which is outputted in response to a rotational direction opposite to an initially determined rotational direction of the rotational member in the predetermined period.

5. A rotation sensor according to claim 1, wherein
the predetermined period includes a vibration determining period,
the rotational state determining portion determines whether the rotational member rotates or vibrates without rotating in the vibration determining period,
the pulse generating portion generates and outputs the third pulse in the vibration determining period,
and wherein, when the rotational state determining portion determines that the rotational member rotates in the vibration determining period, the pulse generating portion generates and outputs one of the first pulse and the second pulse in response to the rotational direction of the rotational member after the vibration determining period elapses.

6. A rotation sensor according to claim 5, wherein
the predetermined period includes an initializing period having a calibrating period and the vibration determining period,
and the pulse generating portion generates and outputs the third pulse in the initializing period.

7. A rotation sensor, comprising:
a detecting portion detecting a rotation of a rotational member and outputting a detection signal;
a rotational state determining portion determining a rotational state of the rotational member on the basis of the detection signal in a predetermined period; and
a pulse generating portion generating and outputting a first pulse and a second pulse, of which waveforms differ from each other, in response to a rotational direction of the rotational member after the predetermined period, the pulse generating portion further generating and outputting a third pulse regardless of the rotational state of the rotational member in the predetermined period; wherein
the third pulse includes the same waveform as one of the first and second pulses, which is outputted in response to a rotational direction opposite to an initially determined rotational direction of the rotational member in the predetermined period.

8. A rotation sensor according to claim 1, wherein
the third pulse includes information regarding a rotational speed of the rotational member.

9. A rotation sensor, comprising:
a detecting portion detecting a rotation of a rotational member and outputting a detection signal;
a rotational state determining portion determining a rotational state of the rotational member on the basis of the detection signal in a predetermined period; and
a pulse generating portion generating and outputting a first pulse and a second pulse, of which waveforms differ from each other, in response to a rotational direction of the rotational member after the predetermined period, the pulse generating portion further generating and outputting a third pulse regardless of the rotational state of the rotational member in the predetermined period; wherein
the predetermined period includes a vibration determining period,
the rotational state determining portion determines whether the rotational member rotates or vibrates without rotating in the vibration determining period,
the pulse generating portion generates and outputs the third pulse in the vibration determining period,
and wherein, when the rotational state determining portion determines that the rotational member rotates in the vibration determining period, the pulse generating portion generates and outputs one of the first pulse and the second pulse in response to the rotational direction of the rotational member after the vibration determining period elapses.

10. A rotation sensor according to claim 9, wherein
the predetermined period includes an initializing period having a calibrating period and the vibration determining period,
and the pulse generating portion generates and outputs the third pulse in the initializing period.

* * * * *